(12) United States Patent  
Erickson et al.

(10) Patent No.: US 7,885,866 B2
(45) Date of Patent: Feb. 8, 2011

(54) TIME PHASED CONFIGURED PRODUCT REUTILIZATION SALES MODEL

(75) Inventors: Steven C. Erickson, Rochester, MN (US); Ivory Wellman Knipfer, Rochester, MN (US); Jeffrey George Komatsu, Kasson, MN (US); John Walter Marreel, Rochester, MN (US); William Robert Taylor, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1302 days.

(21) Appl. No.: 11/379,834

(22) Filed: Apr. 24, 2006

(65) Prior Publication Data

US 2006/0190291 A1 Aug. 24, 2006

(51) Int. Cl.
G06Q 10/00 (2006.01)
G06G 1/14 (2006.01)
(52) U.S. Cl. .......................... 705/28; 705/22
(58) Field of Classification Search ........... None
See application file for complete search history.

(56) References Cited

U.S. PATENT DOCUMENTS

| 5,099,431 | A | 3/1992 | Natarajan |
| 5,311,424 | A | 5/1994 | Mukherjee et al. |
| 6,810,401 | B1 | 10/2004 | Thompson et al. |
| 6,816,839 | B1 | 11/2004 | Gung et al. |
| 6,970,841 | B1 | 11/2005 | Cheng et al. |
| 2002/0072977 | A1* | 6/2002 | Hoblit et al. ............ 705/22 |
| 2004/0093287 | A1 | 5/2004 | Gupta et al. |
| 2005/0080669 | A1 | 4/2005 | Zhang |
| 2005/0119951 | A1* | 6/2005 | Laub et al. ............ 705/28 |
| 2006/0200262 | A1 | 9/2006 | Dyer |

OTHER PUBLICATIONS

Haag, "Sales configuration in business processes", IEEE Intelligent Systems, vol. 13, No. 4, pp. 78-85, Jul.-Aug. 1998.
Yu et al., "A configuration tool to increase product competitiveness", IEEE Intelligent Systems, vol. 13, No. 4, pp. 34-41, Jul.-Aug. 1998.
Leehane, "Level II Technical Support in a Distributed Computing Environment", The Cyclone of Change: Natural Disaster or Carnival Ride?, pp. 95-153.
Grenci et al., "Solutions-Driven Marketing: Navigating the maze of options and providing a link between product customization and e-commerce", Communications of the ACM, Mar. 2002, vol. 45, No. 3, pp. 65-71.

* cited by examiner

*Primary Examiner*—F. Ryan Zeender
*Assistant Examiner*—Denisse Ortiz Roman
(74) *Attorney, Agent, or Firm*—Yee & Associates, P.C.; Steven L. Bennett

(57) ABSTRACT

A time-phased reutilization of configured products is provided. Partially configured products are detected. Each partially configured product is analyzed to determine if the partially configured product is a valid partially configured product, suitable for being modified into other configurations. A time phased management process is applied to the valid partially configured product.

20 Claims, 4 Drawing Sheets

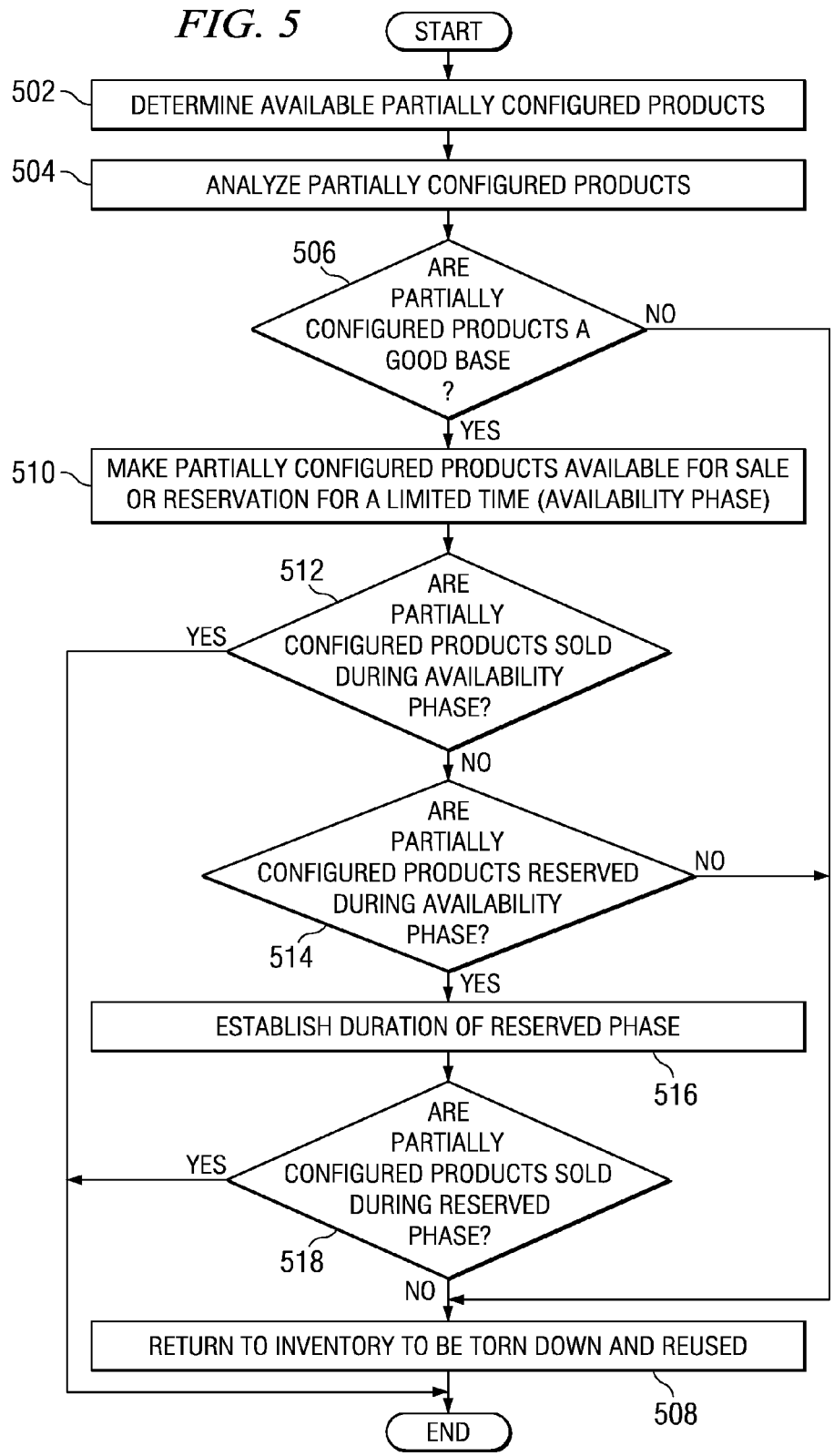

TIME PHASED CONFIGURED PRODUCT REUTILIZATION SALES MODEL

BACKGROUND OF THE INVENTION

1. Field of the Invention

The present invention relates generally to data processing systems. More specifically, the present invention relates to a timed phase reutilization of configured products.

2. Description of the Related Art

Modern manufacturers are always in a state of flux, assembling and tearing down specialized products. These specialized products are produced specifically to the configuration requirements of a customer and are often referred to as one-of-a-kind configurations. The teardown may result from various events, including products built for extended failure analysis tests, products built for loaners for other parts of a company under a warranty period, or even products that were cancelled during the manufacturing process. The problem is that tearing down specialized products is costly, induces damage, impacts cycle time, and capacity of the manufacturer during peak manufacturing periods.

Some companies build up products as finished goods and put these goods into stock. These fixed stock items are then advertised for sale as fixed products with a defined released part number. Some companies also resell cancelled inventory in a similar fashion. Still, the cancelled inventory is complete finished goods. This process, however, does not lend itself to a configure-to-order business, where the configuration permutations represent millions of possible stocking items. Additionally this model does not accommodate products that are partially assembled and tested that have never finished the manufacturing process to become a finished, shippable good.

Other companies tear down most of the returned or specialized products back into purchased or subassembly components. The companies then build the new customer orders from these parts specifically to the customer configuration, upon receipt of the order. This practice results in damaged components, additional scrap from one-time-used parts, and impacts resources during manufacturing peak production.

Therefore, it would be beneficial to reutilize partially configured products in a timely and efficient manner. "Partially configured" products are products that were built and/or tested to a certain point in the specification of the product, but not completed. Partially configured products can be offered for sale and sold as "starting point" configurations or complete configurations, depending upon the completeness of the manufacturing activities and the requirements of the customer configuration. By using this starting point, the labor and cycle time already imbedded into the product can be leveraged for a new customer with a similar requirement.

BRIEF SUMMARY OF THE INVENTION

Exemplary embodiments describe a computer implemented method, a computer program product and a data processing system for a time-phased reutilization of configured products. Partially configured products are detected. The partially configured product is analyzed to determine if the partially configured product is a valid partially configured product, suitable for being modified into other configurations. A time phased management process is applied to the valid partially configured product.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a flowchart illustrating the operation of time phased configured product reutilization in accordance with an illustrative embodiment.

DETAILED DESCRIPTION OF THE INVENTION

Figure 1:
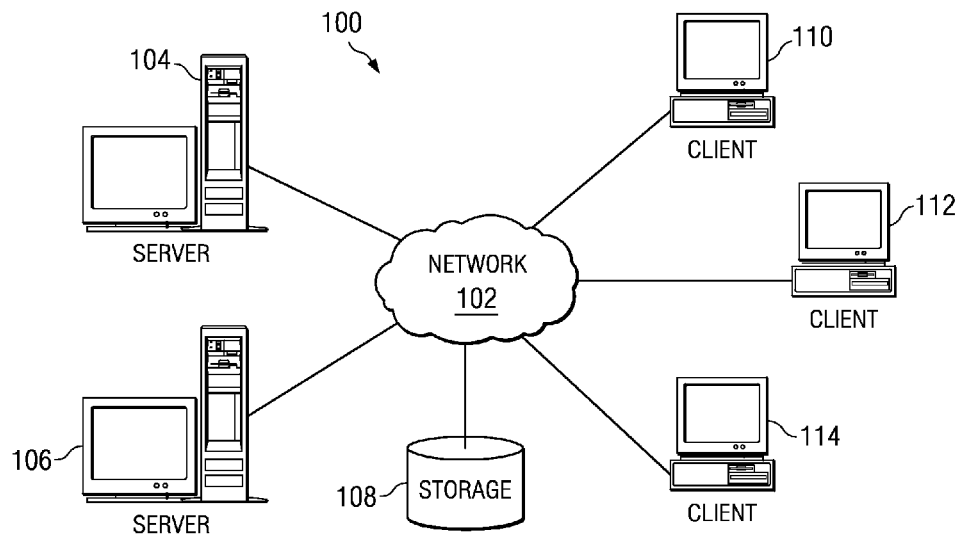
FIG. 1 is a pictorial representation of a network of data processing systems in which exemplary aspects may be implemented.
Figure 2:
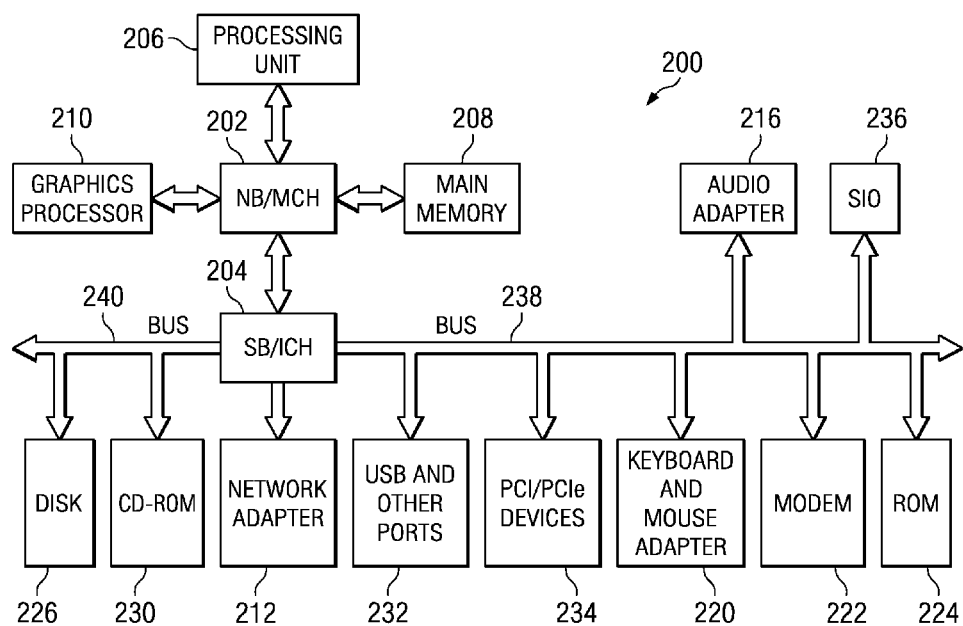
FIG. 2 is a block diagram of a data processing system in which exemplary aspects may be implemented.

FIGS. 1-2 are provided as exemplary diagrams of data processing environments in which embodiments may be implemented. It should be appreciated that FIGS. 1-2 are only exemplary and are not intended to assert or imply any limitation with regard to the environments in which aspects or embodiments may be implemented. Many modifications to the depicted environments may be made without departing from the spirit and scope.

With reference now to the figures, FIG. 1 depicts a pictorial representation of a network of data processing systems in which aspects may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which aspects may be implemented. Data processing system 200 is an example of a computer, such as server 104 or client 110 in FIG. 1, in which computer usable code or instructions implementing the processes for embodiments may be located.

In the depicted example, data processing system 200 employs a hub architecture including north bridge and memory controller hub (NB/MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Exemplary aspects provide an efficient use of partially assembled "configured" one-of-a-kind products to improve order to ship cycle times, eliminate scrap and defects, and improve revenue opportunity during peak manufacturing production, for which a new process was required. Finished goods sales are not adequate for a configured, one-of-a-kind, business. Finished goods sales result in high rates of finished goods inventory due to the configuration permutations and combinations.

An exemplary embodiment provides for a partially configured product reutilization model. Partially configured products that are not currently allocated to a customer order are analyzed. "Valid" partially configured products are made available to the sales force to use as either starting point configurations or complete configurations to be sold. Valid partially configured products are those partially configured products that are capable of being used as a base, or starting point, for making further modifications to reach a new configuration for sale by a sales force. A time phased management process is applied to the reutilization model to ensure effective and timely use of inventory.

Implementation of such a method enables the efficient reuse of assets and eliminates scrap. Cycle times are reduced, especially during peak manufacturing times. Additional revenues are produced during peak manufacturing times and revenue cutoff times that would not have been possible to produce utilizing standard configure-to-order cycle times.

Exemplary aspects provide for an automated method to detect, advertise, manage, and sell partially configured products as starting point configurations or exact configurations, if the customer order matches the specification of the partially configured product exactly. Exemplary embodiments implement a filter method to look for appropriate "valid" partially configured product, based on simple rules. Examples of the simple rules include, but are not limited to, the extent to which the product has been assembled, how much testing has been done on the product, special features, and so forth. Configurations of partially configured products that pass the filter criteria are made immediately available to the sales force. An exemplary embodiment allows the sales force to reserve, order, or limitedly reconfigure the available configurations of the partially configured product. Exemplary aspects also ensure that the manufacturer matches the reservation to the order placed and performs the remaining personalization and configuration on the partially configured products.

Figure 3:
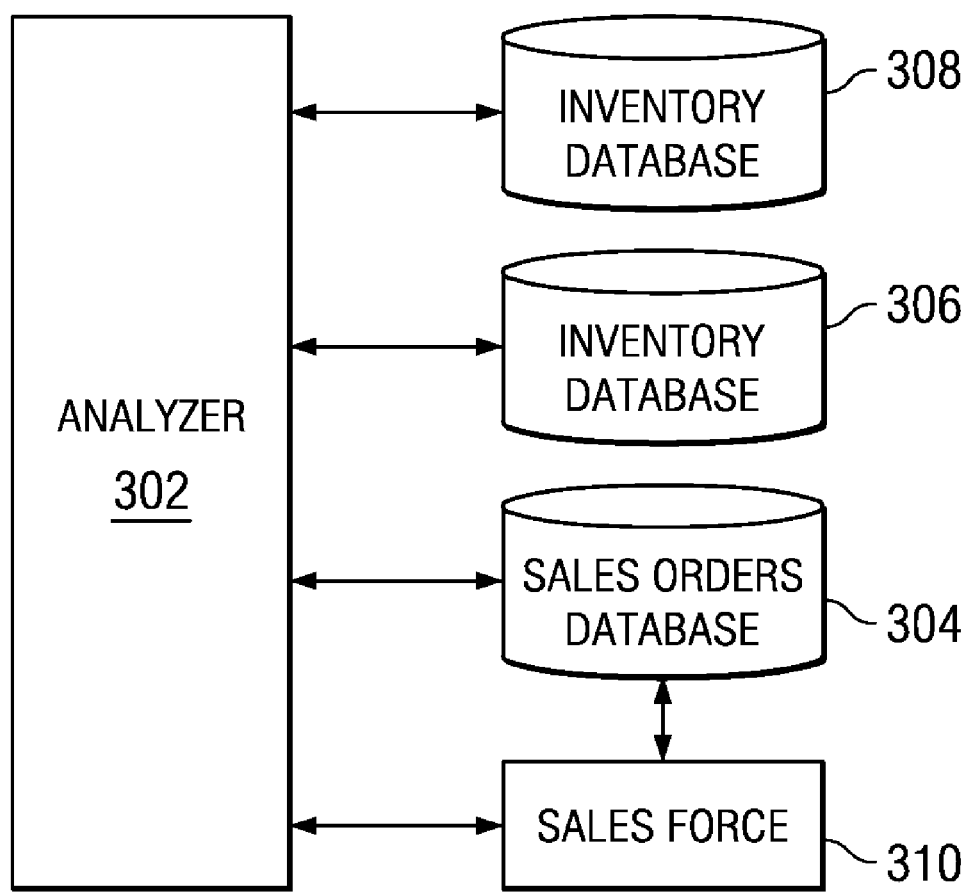
FIG. 3 is a block diagram illustrating a system for implementing a time phased configured product reutilization in accordance with an illustrative embodiment.

FIG. 3 is a block diagram illustrating a system for implementing a time phased configured product reutilization sales model in accordance with an illustrative embodiment. Analyzer 302 continually queries the various inventory databases, such as inventory databases 306 and 308, looking for partially assembled configured products that are not currently allocated to a customer order. A configured product is a specialized product or a one-of-a-kind product. Analyzer 302 checks this inventory versus sales orders database 304. Analyzer 302 analyzes the available partially configured products to determine if any of the available partially configured products are valid partially configured products, suitable for being modified into other configurations. Analyzer 302 attempts to make valid partially configured products available to sales force 310 to use as either starting point configurations or complete configurations to be sold. Analyzer 302 communicates with sales force 310 through any appropriate internal communications method, such as publishing to a sales force website or an intranet communication, for example. Analyzer 302 applies a time phased management process by assigning a duration for which inventory identified from inventory databases 306 and 308 is reserved and available to sales force 310 only for a limited time before the product is returned to inventory to be reused or torn down. In general, a time phased management process is a process that uses phases with specific time durations to manage some aspect of the process. In exemplary embodiments, phases with specific time durations control the availability of the partially configured product for sale and reconfiguration.

Figure 4:
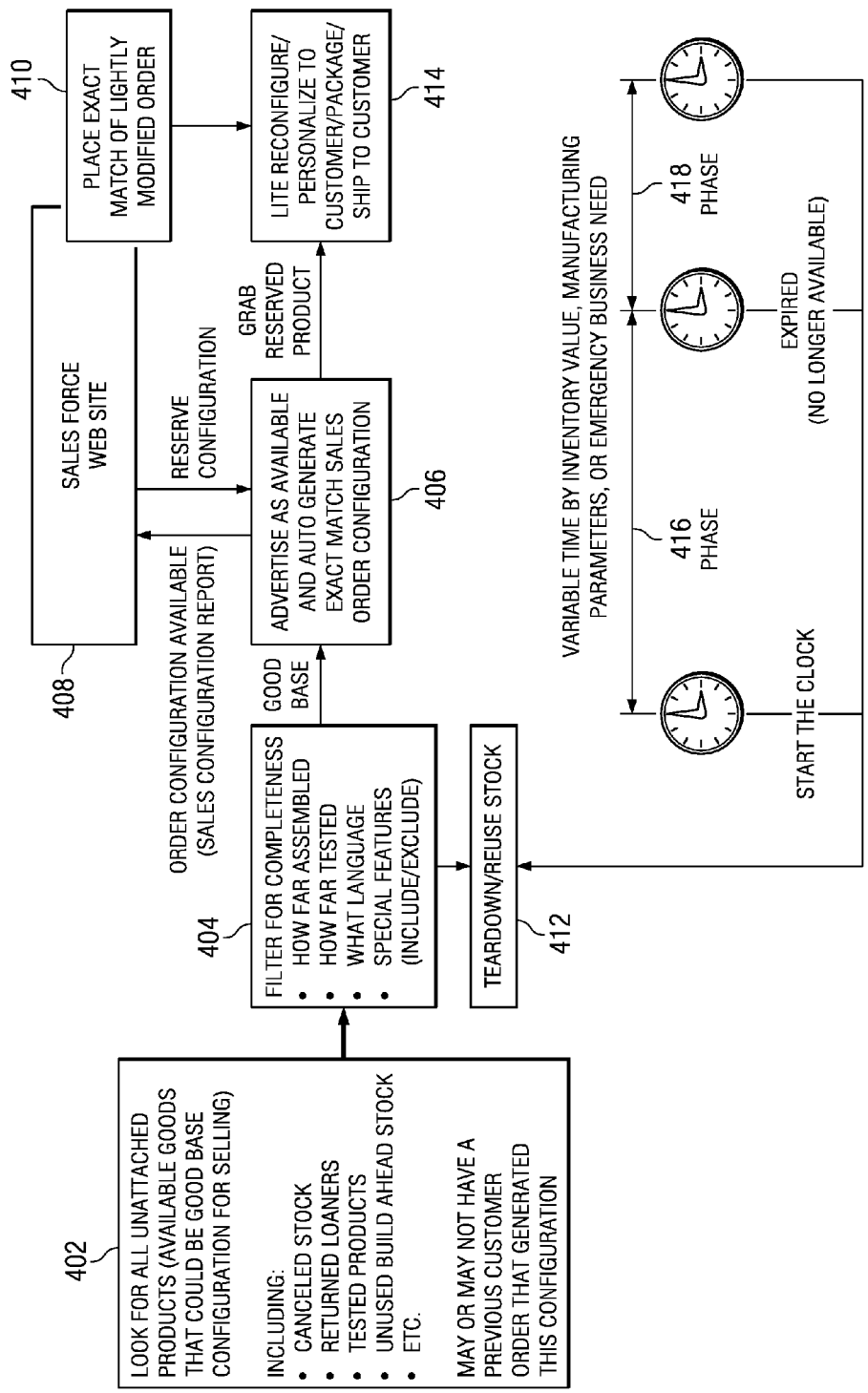
FIG. 4 is a block diagram illustrating a time phased configured product reutilization sales model in accordance with an illustrative embodiment.

FIG. 4 is a block diagram illustrating a time phased configured product reutilization sales model in accordance with an illustrative embodiment. In block 402 unattached products are collected. The data processing system searched for all unattached specialized products. Unattached specialized products are available products that are partially configured and are good base configurations for selling as another configuration. A partially configured product is a product that is partly built to the specifications of an order, but not completely built. In order to locate unattached specialized products, searches are conducted in cancelled stock, returned internal test builds, tested products, unused build ahead stock, and any other applicable inventory classifications. It is possible that a previous customer order may have generated the particular configuration in question. Once the unattached specialized products are determined, the process proceeds to block 404. In block 404 the unattached specialized products, or partially configured products, are filtered according to their completeness. The partially configured products may be sorted according to how far the product has been assembled, how far tested, if any language specification information is already included, or based upon the exclusion or inclusion of specific special features. Partially configured products that are determined to not be good bases to sell from are put in teardown/reuse stock 412. If the partially configured product is determined to be a good base to start selling from, the partially configured product is advertised as available and an exact match sales order configuration is generated, as indicated in block 406. This information is passed to sales force website 408, which shows the order configuration as available. From sales force website 408, two actions are possible. The first action is a reservation of a particular configuration and an update to the availability status of the configuration in block 406. Once an actual order for the reserved partially configured product is received, the reserved product is grabbed, reconfigured to match the order, packaged, and shipped to the customer (step 414). Or, as indicated by block 410, an actual order is placed through sales force web site 408. The actual order may be for products that exactly match the partially configured products or the order may be for products that only require a minimal amount of reconfiguring of the partially configured products. The partially configured products are then modified, packaged, and shipped to the customer (step 414).

As seen in the figure, once the partially configured product reaches stage 406, variable time phase 416 is started. A particular user may refer to this phase by any name. For the purposes of this disclosure, the phase shall be referred to as the availability phase. The availability phase is the period of time during which the valid partially configured products are available for sale or reservation. The partially configured product can only be held as ready to sell for a variable time before it expires and is returned as teardown/reuse stock 412. The duration of the times phase may be determined by inventory value, manufacturing parameters, emergency business needs, or any other appropriate measure. Also, as shown in FIG. 4, there is a second timed phase, indicated by reference number 418, referred to as a reserved phase, that starts once the partially configured product is reserved by the sales force. The reserved phase is the period of time during which the reserved partially configured product is available be to be sold. If the partially configured product is not moved from reserve status to ordered status within the predetermined time phase, then the partially configured product is returned as teardown/reuse stock 412.

FIG. 5 is a flowchart illustrating the operation of time phased configured product reutilization in accordance with an illustrative embodiment. The operation begins by detecting available partially configured products (step 502). Then the operation analyzes the available partially configured products (step 504). In an exemplary embodiment, a filter, based upon simple rules, is used to analyze the available partially configured products. The operation determines if the available partially configured products are a good base for other possible configurations (step 506). Such available partially configured products are known as valid partially configured products. If the operation determines that the available partially configured products are not a good base for other possible configurations (a "no" output to step 506), the available partially configured products are returned to inventory to be torn down and reused (step 508) and the operation ends.

If the operation determines that the available partially configured products are a good base for other possible configurations (a "yes" output to step 506), the available partially configured products are made available for sale for a limited time (step 510). This limited time period is known as the availability phase. The operation determines if the partially configured products were sold during the availability phase (step 512). If the operation determines that the partially configured products were sold during the availability phase (a "yes" output to step 512), the operation ends. If the operation determines that the partially configured products were not sold during the availability phase (a "no" output to step 512), the operation determines if the partially configured products were reserved during the availability phase (step 514).

If the operation determines that the partially configured products were not reserved during the availability phase (a "no" output to step 514), the operation repeats step 508. If the operation determines that the partially configured products were reserved during the availability phase (a "yes" output to step 514), the operation establishes a duration for the reserved phase (step 516). Then the operation determines if the partially configured product was sold during the reservation phase (step 518). If the operation determines that the partially configured products were sold during the reserved phase (a "yes" output to step 518), the operation ends. If the operation determines that the partially configured products were not sold during the reserved phase (a "no" output to step 518), the operation repeats step 508.

Real-time monitoring of products through time phased rules ensures good utilization of inventory, eliminates stagnant products, and provides manufacturing with the flexibility of managing inventory based upon asset value, inventory levels, or other business needs.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for a time-phased reutilization of configured products, the computer-implemented method comprising:
    detecting, by a processing unit, a partially configured product that did not finish a manufacturing process;
    analyzing, by the processing unit, the partially configured product to determine if the partially configured product is suitable for being offered for sale even though the partially configured product did not finish the manufacturing process;
    responsive to a determination that the partially configured product is suitable for being offered for sale even though the partially configured product did not finish the manufacturing process based on a matching customer configuration in another customer order, offering the partially configured product for sale; and
    applying, by the processing unit, a time phased management process to the partially configured product.

2. The computer-implemented method of claim 1, wherein the time phased management process further comprises:
    assigning, by the processing unit, a specified time duration for which the partially configured product is offered for sale for only a limited time period before being placed in tear down stock;
    responsive to a determination that the partially configured product is not reserved for sale or sold during the specified time duration, putting the partially configured product in the tear down stock;
    responsive to a determination that the partially configured product is reserved for sale by a sales force during the specified time duration, assigning a duration to a reserved phase for the partially configured product that is in addition to the specified time duration, wherein the partially configured product remains reserved for sale during the reserved phase; and
    responsive to a determination that the partially configured product is not sold during the reserved phase, putting the partially configured product in the tear down stock.

3. The computer implemented method of claim 2, wherein the specified time duration for which the partially configured product is offered for sale is determined by manufacturing parameters.

4. The computer implemented method of claim 1, wherein analyzing the partially configured product comprises using a completeness filter to determine if the partially configured product is suitable for being offered for sale even though the partially configured product did not finish the manufacturing process.

5. The computer implemented method of claim 4, wherein the completeness filter is based on rules.

6. The computer implemented method of claim 5, wherein the rules are based on how far the partially configured product has been assembled.

7. The computer implemented method of claim 1, further comprising:
    allowing the partially configured product to be reconfigured to meet customer specifications of another customer, wherein the partially configured product is a partially assembled one-of-a-kind customer configured product produced specifically for a customer by a manufacturer according to a specified configuration by the customer but did not finish the manufacturing process and is not currently attached to a customer order for the customer.

8. A computer program product comprising a computer usable medium including computer usable program code for a time-phased reutilization of configured products, the computer program product comprising:
   computer usable program code for detecting a partially configured product that did not finish a manufacturing process;
   computer usable program code for analyzing the partially configured product to determine if the partially configured product is suitable for being offered for sale even though the partially configured product did not finish the manufacturing process;
   computer usable program code, responsive to a determination that the partially configured product is suitable for being offered for sale even though the partially configured product did not finish the manufacturing process based on a matching customer configuration in another customer order, for offering the partially configured product for sale; and
   computer usable program code for applying a time phased management process to the partially configured product.

9. The computer program product of claim 8, wherein the computer usable program code for applying the time phased management process further comprises:
   computer usable program code for assigning a specified time duration for which the partially configured product is offered for sale for only a limited time period before being placed in tear down stock;
   computer usable program code, responsive to a determination that the partially configured product is not reserved for sale or sold during the specified time duration, for putting the partially configured product in the tear down stock;
   computer usable program code, responsive to a determination that the partially configured product is reserved for sale by a sales force during the specified time duration, for assigning a duration to a reserved phase for the partially configured product that is in addition to the specified time duration, wherein the partially configured product remains reserved for sale during the reserved phase; and
   computer usable program code, responsive to a determination that the partially configured product is not sold during the reserved phase, for putting the partially configured product in the tear down stock.

10. The computer program product of claim 9, wherein the specified time duration for which the partially configured product is offered for sale is determined by manufacturing parameters.

11. The computer program product of claim 8, wherein the computer usable program code for analyzing the partially configured product comprises computer usable program code for using a completeness filter to determine if the partially configured product is suitable for being offered for sale even though the partially configured product did not finish the manufacturing process.

12. The computer program product of claim 11, wherein the completeness filter is based on rules.

13. The computer program product of claim 12, wherein the rules are based on how far the partially configured product has been assembled.

14. The computer program product of claim 8, further comprising:
   computer usable program code for allowing the partially configured product to be reconfigured to meet customer specifications of another customer, wherein the partially configured product is a partially assembled one-of-a-kind customer configured product produced specifically for a customer by a manufacturer according to a specified configuration by the customer but did not finish the manufacturing process and is not currently attached to a customer order for the customer.

15. A data processing system for a time-phased reutilization of configured products, the data processing system comprising:
   a storage device, wherein the storage device stores computer usable program code; and
   a processor, wherein the processor executes the computer usable program code to detect a partially configured product that did not finish a manufacturing process; analyze the partially configured product to determine if the partially configured product is suitable for being offered for sale even though the partially configured product did not finish the manufacturing process; offer the partially configured product for sale in response to a determination that the partially configured product is suitable for being offered for sale even though the partially configured product did not finish the manufacturing process based on a matching customer configuration in another customer order; and apply a time phased management process to the partially configured product.

16. The data processing system of claim 15, wherein the computer usable program code for applying the time phased management process further comprises:
   computer usable program code for assigning a specified time duration for which the partially configured product is offered for sale for only a limited time period before being placed in tear down stock;
   computer usable program code, responsive to a determination that the partially configured product is not reserved for sale or sold during the specified time duration, for putting the partially configured product in the tear down stock;
   computer usable program code, responsive to a determination that the partially configured product is reserved for sale by a sales force during the specified time duration, for assigning a duration to a reserved phase for the partially configured product that is in addition to the specified time duration, wherein the partially configured product remains reserved for sale during the reserved phase; and
   computer usable program code, responsive to a determination that the partially configured product is not sold during the reserved phase, for putting the partially configured product in the tear down stock.

17. The data processing system of claim 15, wherein the specified time duration for which the partially configured product is offered for sale is determined by manufacturing parameters.

18. The data processing system of claim 15, wherein the computer usable program code for analyzing the partially configured product comprises computer usable program code for using a completeness filter to determine if the partially configured product is suitable for being offered for sale even though the partially configured product did not finish the manufacturing process.

19. The data processing system of claim 18, wherein the completeness filter is based on rules.

20. The data processing system of claim 15, wherein the process further executes the computer usable program code to allow the partially configured product to be reconfigured to meet customer specifications of another customer, wherein the partially configured product is a partially assembled one-of-a-kind customer configured product produced specifically for a customer by a manufacturer according to a specified configuration by the customer but did not finish the manufacturing process and is not currently attached to a customer order for the customer.

* * * * *